United States Patent [19]
Fletcher

[11] 3,732,587
[45] May 15, 1973

[54] LIGHTWEIGHT VEHICLE

[76] Inventor: Harold A. Fletcher, Route 2, Box 142, Tulelake, Calif. 96136

[22] Filed: Aug. 13, 1971

[21] Appl. No.: 171,648

[52] U.S. Cl. .............................9/6, 9/1 R
[51] Int. Cl. ...............................B63b 5/24
[58] Field of Search .........114/0.5 F, 43.5; 9/1 R, 6

[56] References Cited

UNITED STATES PATENTS

| 2,975,747 | 3/1961 | Opie | 114/61 |
|---|---|---|---|
| 3,115,860 | 12/1963 | Payne | 114/66.5 F |

Primary Examiner—Milton Buchler
Assistant Examiner—E. R. Kazenske
Attorney—Bruce & McCoy

[57] ABSTRACT

A lightweight vehicle constructed from a portion of styrofoam material sandwiched between a pair of stiff outer members held together by a plurality of straps made from non-rusting material wrapped around the outer surface of the stiff members and the styrofoam material.

2 Claims, 5 Drawing Figures

PATENTED MAY 15 1973 3,732,587
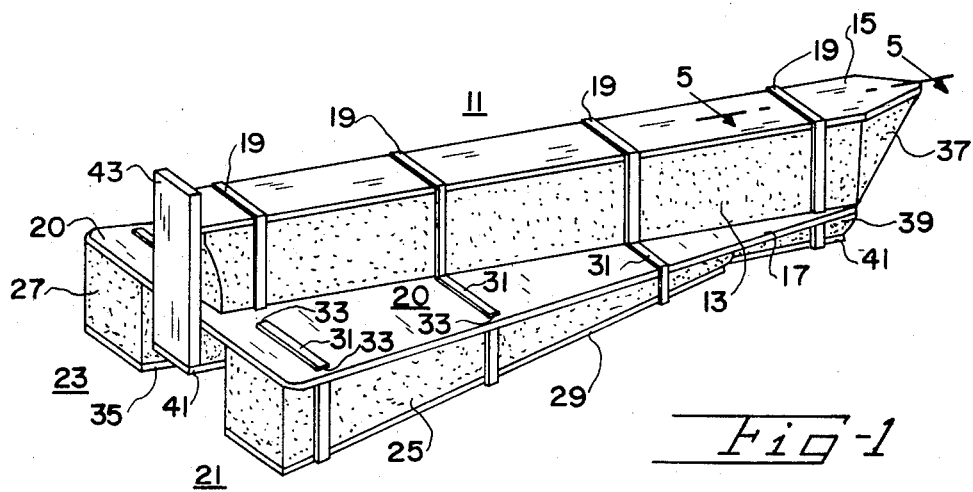
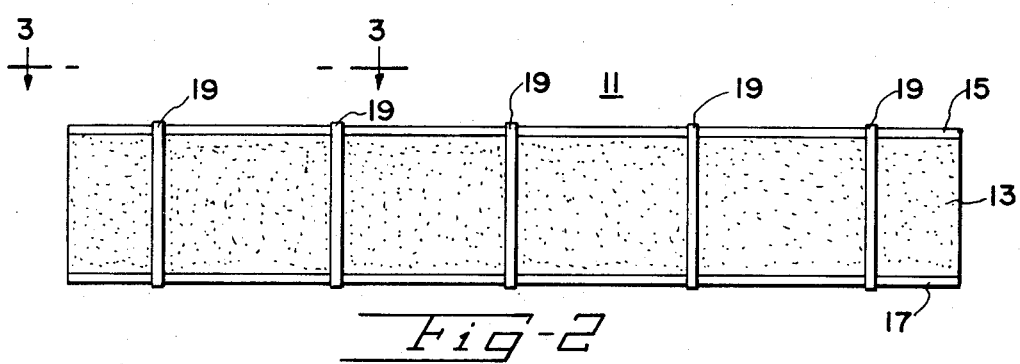
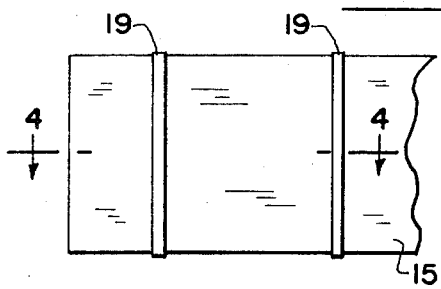
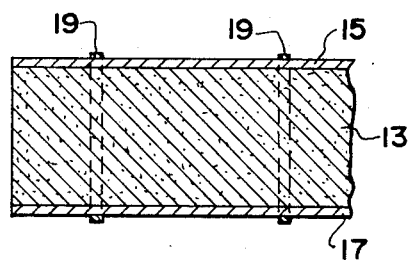
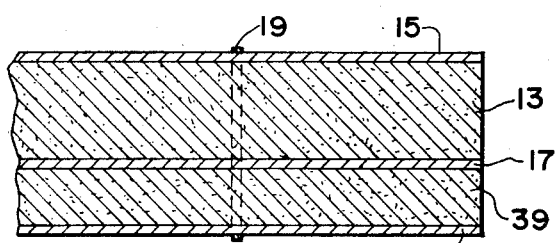
INVENTOR.
HAROLD A. FLETCHER
BY Bruce & McCoy

LIGHTWEIGHT VEHICLE

BACKGROUND OF THE INVENTION

1. Field of the Invention

The present invention relates to lightweight vehicles and, in particular, to a lightweight boat or flotation capable of carrying a load.

One of the problems associated with vehicles for handling materials or people on land or the water is the weight of the vehicle in comparison with its capability of carrying a load. That is, in order to carry a heavier load, the vehicle must be of such a strength and rigidity that the load may be properly supported. This usually entails the use of materials and/or braces to provide the necessary rigidity and strength. The addition of these necessary elements also adds to the weight of the vehicle, which usually results in a loss of weight of the load that may be supported thereby. Furthermore, when heavily loaded vehicles are placed in water, special precautions must be taken to prevent the vehicle from sinking if an obstacle is struck or the vehicle is somehow damaged.

2. Description of the Prior Art

Materials and methods are known whereby a lightweight material may be used in combination with stiffeners and reinforcing elements to support a load. The majority of these vehicles are for use as boats or rafts and usually include at least one hollow chamber wherein a flotation material, such as styrofoam, expanded polyurethanes, or the like are inserted to increase the buoyancy or flotation of the vehicle. One such floating dock or raft is disclosed in U.S. Pat. No. 3,289,621 to Sebring. This patent discloses the use of rectangular polystyrene flotation blocks at the four corners of each dock section whereby the floating dock sections may be supported in the water. In the operative position, the flotation blocks are bolted by a plurality of elongated threaded bolts extending vertically through portions of the deck planking, the flotation blocks themselves, and through an elongated bearing board associated with each block. Nuts are then threaded on the projecting lower ends of the rods to draw the bearing boards upwardly against the bottom of the flotation blocks to effect a firm clamping of the floatation blocks against the under surface of the deck planking. In a further shipping or storing position, the flotation blocks are laid on their sides and may be substantially received within a compartment to provide a flat package about which metal strapping can be applied in order to ship or store the floating docks until they are to be used. The docks of this patent are heavy and the styrofoam blocks are easily damaged or will be weakened and eventually broken up by the bolts passing therethrough. When used as docking, the flotation will be subjected to twist and misalignment by waves normally found in water. The holes provided for the bolts weakens the styrofoam material and the styrofoam, if dismantled, may not be used for other purposes.

The known devices set forth in the prior art and, in particular, in the above-set-forth patent, fail to disclose the particular construction and means of applicant's present invention wherein a polystyrene block is sandwiched between a pair of stiff outer members and held together by a plurality of straps secured thereabout, without the need of further stiffening members thereby eliminating the passage of bolts, or the like, through the polystyrene material and precluding the possibility of tearing or separation of the material from the outer supporting or binding members.

SUMMARY OF THE INVENTION

The present invention is a vehicle constructed from a portion of expanded polystyrene material held between a pair of stiff outer members by means of at least one non-rusting strap encircling the outer stiff members and the polystyrene material to bind the material and members together.

The invention also contemplates a method for the formation of a vehicle by constructing the vehicle from at least one piece of polystyrene material sandwiched between a pair of stiff outer members and binding the sandwiched materials together by encircling the materials and the polystyrene material with a plurality of non-rusting bands and locking the bands in place.

OBJECTS OF THE INVENTION

It is therefore an important object of the present invention to provide a lightweight vehicle for use on land or land and in the water.

It is another object of the present invention to provide a vehicle constructed from three or more pieces of material sandwiched together.

It is a further object of the present invention to provide a lightweight flotation or boat constructed from a portion of flotation material sandwiched between a pair of stiffening outer members.

It is yet another object of the present invention to provide a lightweight flotation or boat constructed from a portion of expanded polystyrene sandwiched between a pair of outer members banded together by a plurality of straps wrapped thereabout.

It is yet a further object of the invention to provide a lightweight flotation or boat which is impossible to sink under normal conditions of usage.

It is still another object of the invention to provide a marine vehicle which can support a large load in relation to its size.

And it is a still further object of the present invention to provide a method for constructing a lightweight flotation or boat by banding a sandwich of materials together.

DESCRIPTION OF THE DRAWINGS

Other objects and advantages of the present invention will become apparent when the lightweight vehicle disclosed herein is considered in conjunction with the accompanying drawings, wherein:

FIG. 1 is a perspective view of one of the many configurations of vehicles capable of being constructed in accordance with the principles of the present invention;

FIG. 2 is a side view illustrating the basic sandwich construction of a section of a vehicle in accordance with the present invention;

FIG. 3 is a partial plan view of the section shown in FIG. 2;

FIG. 4 is a cross-section taken along line 4—4 of FIG. 3; and

FIG. 5 is a partial cross-section taken long line 5—5 of FIG. 1.

DESCRIPTION OF THE PREFERRED EMBODIMENT

Reference is made to the drawings for a description of the preferred embodiment wherein like reference numerals represent like elements on corresponding views.

The present invention is a lightweight vehicle, such as a boat, car, or flotation dock capable of supporting a load many times the weight of the vehicle. Moreover, the vehicle is practically indestructible and unsinkable, providing a safety factor heretofore unknown in vehicles of this type.

The simplest type of vehicle constructed by the method of the present invention consists of a single block of expanded polystyrene material, commonly known as styrofoam or polyurethane, cut to the desired shape and provided with frame, stiffener or support members may be used to form the deck of a flotation or boat. The stiffener members are of a relatively stiff material for added strength and strapped to the block by belting wrapped around the outer surface of the stiffener members to thereby sandwich the styrofoam between these members. The belting is then tightened and secured in position. In this manner, no fastening means actually passes through the styrofoam material, but the compression of the stiffening members held together by the belting means provides a high degree of rigidity and strength to the formed vehicle.

Other members formed by sandwiching styrofoam blocks bound together by wrapping bands therearound may be added to the basic body formed above to provide braces, pontoons, seats, or the like. Furthermore, the vehicle may be easily dismantled by removing the straps and the stiffening members and polystyrene material used for other purposes.

FIGS. 2 and 3 of the drawings illustrate the basic concept of the present invention, which comprises a section (11) having at least one expanded polystyrene, such as styrofoam or polyurethane, block of material (13), sandwiched between a pair of flat, relatively stiff outer boards or members (15,17). Members (15,17) are made from plywood, fiberglass or some other suitably stiff material, such as a light metal, capable of forming an outer supporting portion. The styrofoam block and the stiff outer members are preferably held or wedged together by at least one strap (19) made from a non-rusting, high strength material, such as stainless steel, high tensile plastic, or the like. The strap or straps are tightened around the expanded polystyrene material sandwiched between the stiff outer members at spaced intervals, depending on the length of the block (13), to provide the required rigidity and strength, and are locked in this tightened position, in any suitable manner, as by clips or other clamping means (not shown). If desired, a plurality of styrofoam blocks may be used and the same may be attached together by being wedged or sandwiched between the pair of stiff outer members (15,17), either individually or in groups.

FIG. 1 of the drawings shows one embodiment of a boat formed by the present invention. It is to be understood, however, that the present invention is not limited to use with the boat shown therein, but may also be used to form floating docks, houseboats, or rafts to transport material and/or people. A vehicle for use on land, or for use on land and sea could easily be constructed by providing the basic sandwich assembly (11) with wheels, seats, power drive, transmission and the like.

The boat of FIG. 1 is preferably constructed by commencing with the central or main section (11), described above. One stiffener member or frame (17) is provided with extending wing-shaped portions (20), only one of which is clearly shown, which may be used as a deck. The shaped portions may be attached to the stiffener member (17), in any suitable manner, or made integral therewith. A pair of preformed pontoons (21,23) are preferably strapped to the wing-shaped portions and main section, enable the boat to carry and sustain weights on the deck which are far above the weight of the boat itself. These large weights are supported without the danger of sinking or tipping, when extended from the main body, inherent in known water vessels.

Each of the pontoons (21,23) is similarly formed by sandwiching blocks of styrofoam (25,27) between outer stiff members and banding or strapping the sandwiched elements together. As shown, pontoon (21) is formed by sandwiching the piece of styrofoam (25), preferably shaped to a predetermined configuration, between an extending wing-shaped portions (20) of the stiff outer member (17) and a further stiff outer member (29) having substantially the same configuration as the piece of styrofoam. Further straps (31) are then bound around the elements (25,29), and, where required, passed through holes (33) formed in the wing-shaped portion (20) to hold the entire pontoon (21) to the main section (11).

The further pontoon (23) is fixed to the main section in a similar manner, by sandwiching the preformed styrofoam material (27) between a similar wing-shaped portion (20) and a further stiff outer board or member (35).

If suitable, the bow of the boat may be streamlined by tapering the end of the styrofoam block (13) and upper stiffener member (15) at (37), as shown. Also, to improve the handling and stability of the boat in water, the central or main section (11) may be extended downwardly or provided with a further downwardly extending portion by sandwiching a portion of styrofoam (39), of any desired length, between the bottom of the stiffener member (17) and a further stiffener member (41). As shown, this further portion of styrofoam (39) may be held between the stiffener members (17,41) by one or more of the same straps (19) which are used to and the main body (11) together.

If it is desired to propel the boat shown in FIG. 1, by an outboard motor or the like, the boat is preferably provided with a mounting board (43) at the rear end thereof. The board (43) is secured to the boat in any convenient manner, as by nailing or stapling, and may be supported at both ends by the stiffener boards such as (41), and an upper board (not shown).

By utilizing a single or plurality of blocks of styrofoam sandwiched between stiff outer members, and strapping these members and blocks together by non-rusting bands or straps encircling the same, a lightweight, high strength vehicle of any desired configuration or shape may be constructed. The finally constructed vehicle will be of very light weight due to the light weight of the materials used and will be practically indestructible due to the banding together of the materials. Since styrofoam and the like normally disintegrates if saturated with gasoline or oil, a protective coating of resistant material is preferably placed over the styrofoam. Furthermore, if desired, a finish coat of fire resistant industrial paint may be applied over the formed structure for aesthetic and safety purposes.

It is thereby believed that the only way to destroy and/or sink a boat made from the above-set-forth construction is by disintegrating the boat with explosives, that is, actually shattering the polystyrene material and outer stiffener members.

The stainless steel or other non-rusting material bands are here used to tightly bundle or wedge the materials together, thereby rigidly attaching the same. This rigid attachment of the materials may only be separated by actually destroying the band or disintegrating the materials used.

The light weight of the polystyrene material allows a practically indestructible vehicle to be constructed. If a portion of the outer stiffener members or the expanded polystyrene filler material is damaged or removed, it may be quickly and easily patched at a minimum of cost in a minimum of time with much less inconvenience.

The stiff outer members provide decks or supporting surfaces, for walking and/or loading supplies or cargo to be carried by the assembled vehicle. When the vehicle is used as a boat, the upper deck is capable of supporting a plurality of persons or a person and a load.

The lightweight craft formed by the present invention is easily driven through the water. If desired, the boat may also be modified to support an inboard engine.

It is to be further understood that any vehicle constructed in accordance with the above-set-forth invention may be easily broken down into its component parts by merely removing the straps binding the members together. The undamaged members may be reused for other purposes, easily transported to a new destination or stored for future use.

The present invention allows lightweight, flat vessels for use as floating platforms or the like to be formed of any desired shape. These vessels may fit into or on a camper or trailer or are capable of being backpacked into the woods to a stream or a lake where the vessel may then be used. Furthermore, such a vessel is capable of supporting at least one man and still having a minimum draft when afloat in the water. This enables the vessel to be used in marshes, shallow water, swamps, or the like, now inaccessible to most known watercraft.

It is therefore an important advantage of the present invention that a lightweight, high strength and rigid vehicle may be constructed by sandwiching a single block of styrofoam material between two outer stiffener members, having substantially the same shape as the styrofoam block and by binding these elements together to form a basic frame. This basic frame may be used as formed, or may be provided with other appendages, elements, or the like, and may further be provided with motivation means, such as a motor, whereby the formed vehicle may be driven on land and water.

It will be apparent from the foregoing description of the invention in its preferred form that it will fulfill all the objects attributable thereto, and while it is illustrated and described in detail, the invention is not to be limited to such details as have been set forth except as may be necessitated by the appended claims.

What is claimed is:

1. A boat constructed from a piece of expanded polystyrene material sandwiched between a pair of plywood outer members, said boat comprising a block of styrofoam having preformed configuration with generally flat upper and lower surfaces, a first plywood member forming the upper deck of said boat and conforming to the upper surface peripheral configuration of said block, a second plywood member forming the bottom of said boat and conforming to the bottom peripheral configuration of said block, and a plurality of stainless steel bands having the ends thereof crimped together forming continuous bands encircling the exterior of said pair of plywood members and said polystyrene material disposed there between for binding said members and said material into a sandwich having the plywood members forming the upper and lower surfaces of said boat to protect the material sandwiched between the plywood members from damage by the passengers occupying boat's upper deck and from damage to the lower surface by rocks and other hard objects with which the bottom of the boat may come into contact.

2. The boat of claim 1 including an intermediate plywood member sandwiched between said first and second plywood members and extending laterally outward from the sides of said block of styrofoam and having further blocks of styrofoam strapped to the bottom of said intermediate plywood member on opposite sides of said block of styrofoam and forming outrigger pontoons for stabilizing said boat, said further blocks of styrofoam having generally flat upper and lower surfaces and preformed configurations and further lower plywood members forming the bottoms of said pontoons and conforming to the bottom peripheral configuration of said blocks forming said pontoons, said blocks being strapped to the bottom of said intermediate plywood member by a plurality of stainless steel bands having the ends thereof crimped together forming continuous bands individually encircling the exterior of said blocks and said lower further plywood members of said pontoons and projecting through holes in said intermediate plywood member.

* * * * *